(12) United States Patent
Vollmayr et al.

(10) Patent No.: US 6,925,353 B2
(45) Date of Patent: Aug. 2, 2005

(54) METHOD AND DEVICE FOR MACHINING CONTOURED RECESSES, UTILIZING A GRAPHICAL USER INTERFACE FOR DEFINING CONTOUR EXPRESSIONS

(75) Inventors: Norbert Vollmayr, Traunwalchen (DE); Maximilian Wimmer, Traunstein (DE)

(73) Assignee: Dr. Johannes Heidenhain GmbH, Traunreut (DE)

( * ) Notice: Subject to any disclaimer, the term of this patent is extended or adjusted under 35 U.S.C. 154(b) by 0 days.

(21) Appl. No.: 10/489,527

(22) PCT Filed: Aug. 2, 2002

(86) PCT No.: PCT/EP02/08601
§ 371 (c)(1),
(2), (4) Date: Mar. 11, 2004

(87) PCT Pub. No.: WO03/023719
PCT Pub. Date: Mar. 20, 2003

(65) Prior Publication Data
US 2004/0243276 A1 Dec. 2, 2004

(30) Foreign Application Priority Data
Sep. 11, 2001 (DE) .......................................... 101 44 710

(51) Int. Cl.$^7$ ............................. G06F 19/00; G09G 5/00
(52) U.S. Cl. ....................... 700/182; 700/187; 345/172; 715/964; 715/970
(58) Field of Search ............................. 700/96–98, 105, 700/159, 179–182, 186, 187; 345/418–420, 630, 650, 661, 676, 172; 715/700, 771, 773, 810, 825–828, 866, 964, 970

(56) References Cited

U.S. PATENT DOCUMENTS

| | | | | | |
|---|---|---|---|---|---|
| 4,618,924 | A | * | 10/1986 | Hinds | 700/86 |
| 5,295,075 | A | * | 3/1994 | Korner et al. | 700/186 |
| 5,388,199 | A | * | 2/1995 | Kakazu et al. | 715/853 |
| 5,402,532 | A | * | 3/1995 | Epstein et al. | 345/422 |
| 5,594,471 | A | * | 1/1997 | Deeran et al. | 345/173 |
| 5,694,562 | A | * | 12/1997 | Fisher | 715/839 |
| 5,796,404 | A | * | 8/1998 | Gentner | 715/823 |
| 5,825,362 | A | * | 10/1998 | Retter | 715/854 |
| 5,847,956 | A | * | 12/1998 | Bronfeld et al. | 700/98 |
| 6,014,131 | A | * | 1/2000 | Barry et al. | 345/172 |
| 6,236,399 | B1 | * | 5/2001 | Nishiyama et al. | 715/810 |
| 6,275,225 | B1 | * | 8/2001 | Rangarajan et al. | 715/700 |
| 6,535,213 | B1 | * | 3/2003 | Ogino et al. | 345/442 |
| 6,806,878 | B2 | * | 10/2004 | Hara et al. | 345/442 |
| 2002/0130872 | A1 | * | 9/2002 | Novikova et al. | 345/473 |
| 2003/0001894 | A1 | * | 1/2003 | Boykin et al. | 345/764 |

FOREIGN PATENT DOCUMENTS

| | | | |
|---|---|---|---|
| EP | 0477398 A | * | 4/1992 |
| EP | 0503251 A | * | 9/1992 |

* cited by examiner

*Primary Examiner*—Maria N. Von Buhr
(74) *Attorney, Agent, or Firm*—Kenyon & Kenyon

(57) ABSTRACT

In a method for machining a contoured recess, a digital control is used to predetermine elementary surfaces, which are linked in a contouring expression using logical operators to form a resulting surface. Various help types are offered to the user on a graphical user interface of the digital control. The operators are explained using graphic symbols and help text. The resultant surface is represented on the user interface.

16 Claims, 3 Drawing Sheets

METHOD AND DEVICE FOR MACHINING CONTOURED RECESSES, UTILIZING A GRAPHICAL USER INTERFACE FOR DEFINING CONTOUR EXPRESSIONS

FIELD OF THE INVENTION

The present invention relates to a method for machining contour pockets and to a device for machining contour pockets.

BACKGROUND INFORMATION

The machining of contour pockets is a common task in the machining of workpieces by a machine tool. Such contour pockets are produced with the aid of a machine tool controlled by a numerical control unit, e.g., by milling a workpiece. In this context, regions of the workpiece surface are machined, which are defined at the start of each instance of contour-pocket machining. Further, typical machining steps for producing a contour pocket then include, for instance, rough drilling, reaming, and finishing.

The defining of the contour pocket may not be a simple task, as soon as the shape of the contour pocket is more complicated than the simplest geometric figures, such as a circle, rectangle, or triangle. Islands may also be left inside the contour pockets, and the borders of the contour pockets may be as complicated as needed.

Conventional numerical control units already offer functions for defining contour pockets. However, these functions do not optimally support the user in achieving his or her objective. In the handbook regarding the software of numerical control unit TNC 426 of the Applicant of the present application, a method is described by which a contour pocket can be defined. To this end, borders of surfaces are defined, which are then rough-worked in a separate cycle. Whether the border describes a pocket or an island depends on the direction and the cutter-radius correction of a border. The contour pocket ultimately formed is then the sum of all pockets minus the sum of all islands. A certain amount of experience is necessary for using this system to define complicated contour pockets, e.g., those made up of several basic shapes. In addition, the contour pocket to be expected can only be assessed in a simulation run after completion of the programming.

It is described in European Published Patent Application No. 0 477 398 that, for the purpose of correcting the cutter radius, complicated workpiece geometries can be produced from more simple base shapes, using set operations (union, intersection, etc.), since then, the cutting-radius correction can already be undertaken on the simpler base shapes.

An aspect of the present invention may provide a method for machining contour pockets, which may allow even inexperienced users to produce contour pockets in a rapid and error-free manner.

An aspect of the present invention may provide a device, which may allow rapid and error-free machining of contour pockets.

SUMMARY

In accordance with an example embodiment of the present invention, in order to machine a contour pocket with the aid of an appropriately equipped numerical control unit, at least a first and a second elementary surface be specified in a first step, which are then combined by an operator in a contour expression in a second step to form a combined or compound surface. After the evaluation of the operation and the calculation of the surface resulting from the contour expression, the resulting surface is displayed in a graphic user interface.

In this context, the user of this method for machining a contour pocket, or the user of an appropriately equipped device, may profit from additional support. Elementary surfaces, whose combination may already be monitored on the user interface during the programming of the numerical control unit, may now be used as a starting point when defining the surface of a contour pocket. Errors may immediately be detected and corrected. The selection of the correct operation is supported by corresponding softkeys, and by the display of help text.

Further aspects of example embodiments of the present invention and details pertaining thereto are derived from the following description of the attached drawings.

DETAILED DESCRIPTION

Figure 1:
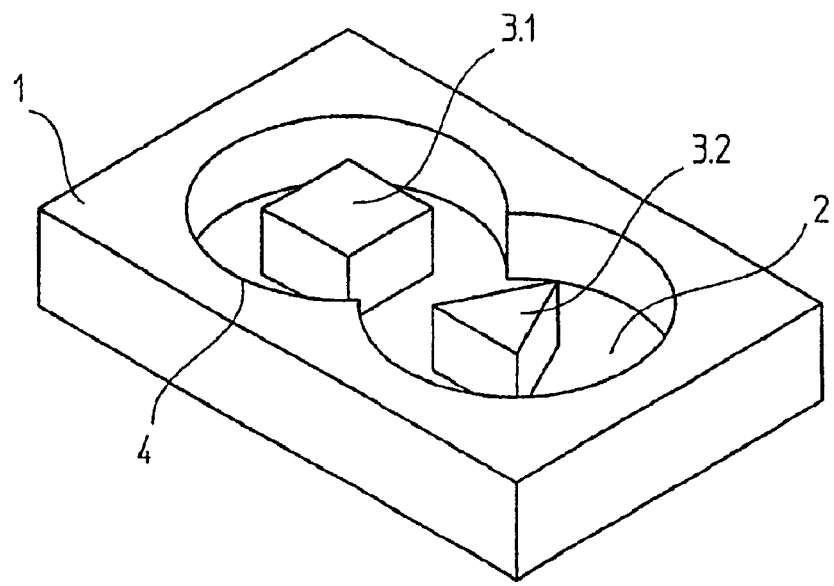
FIG. 1 illustrates a workpiece having a contour pocket.
Figure 2:
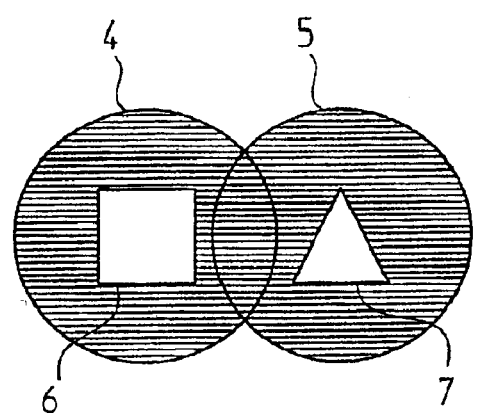
FIG. 2 illustrates the surface of a contour pocket.

FIG. 1 shows a workpiece 1 having a contour pocket 2, which contains two islands 3.1 and 3.2. As illustrated in FIG. 2, the surface of contour pocket 2 is formed by taking the union of two elementary surfaces 4 (in this example, two circular surfaces 4 and 5) and then taking the intersection of this union and the complement of a square 6 and the complement of a triangle 7. The intersection of a surface and the complement of another surface may also be seen as the calculation of the difference of the two surfaces. In the example, square 6 and triangle 7 are subtracted from the union of the two circular surfaces 4 and 5. Actual contour pocket 2 of workpiece 1 is then formed, for example, by milling it.

Figure 3:
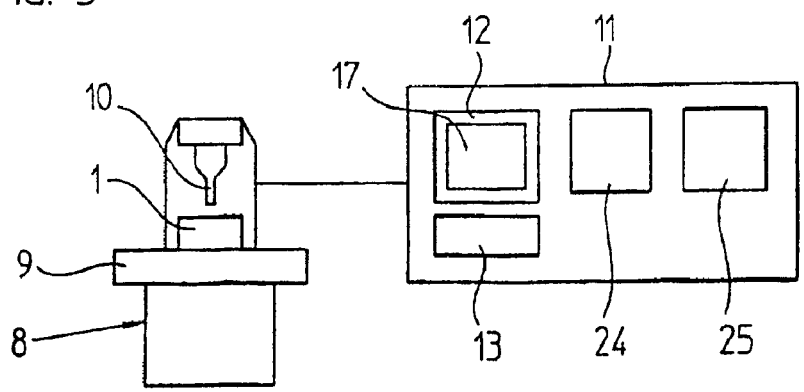
FIG. 3 illustrates a machine tool having a numerical control unit.

Such milling is carried out by a machine tool 8, as is illustrated in FIG. 3. Workpiece 1 is mounted to a machining table 9. The relative movement of workpiece 1 and tool 10 causes tool 10 to be guided through workpiece 1, so as to remove material. In this context, the movable axes of machine tool 8 are controlled by a numerical control unit 11. This numerical control unit 11 may also be used to generate the machining programs for machine tool 8. One aspect of this is the programming of the contour-pocket machining. The defining of the surface of contour pocket 2 may be considered to be the most important step for this. Further steps include, for example, the selection of a suitable tool 10, the best reaming strategy, the machining depth, the desired surface quality, etc. However, in the following, the definition of contour pocket 2 shall only mean the definition of the surface of a contour pocket 2.

Numerical control unit 11 is provided with a video screen 12 having a graphic user interface 17, as is later explained on the basis of FIG. 6. In order to allow user inputs, the numerical control unit is also provided with a keyboard 13 and/or other input options. A memory 24 is used to store all data required for carrying out the machining of the workpiece. These data are processed and all necessary actions are initiated in a processing unit 25.

Figure 4:
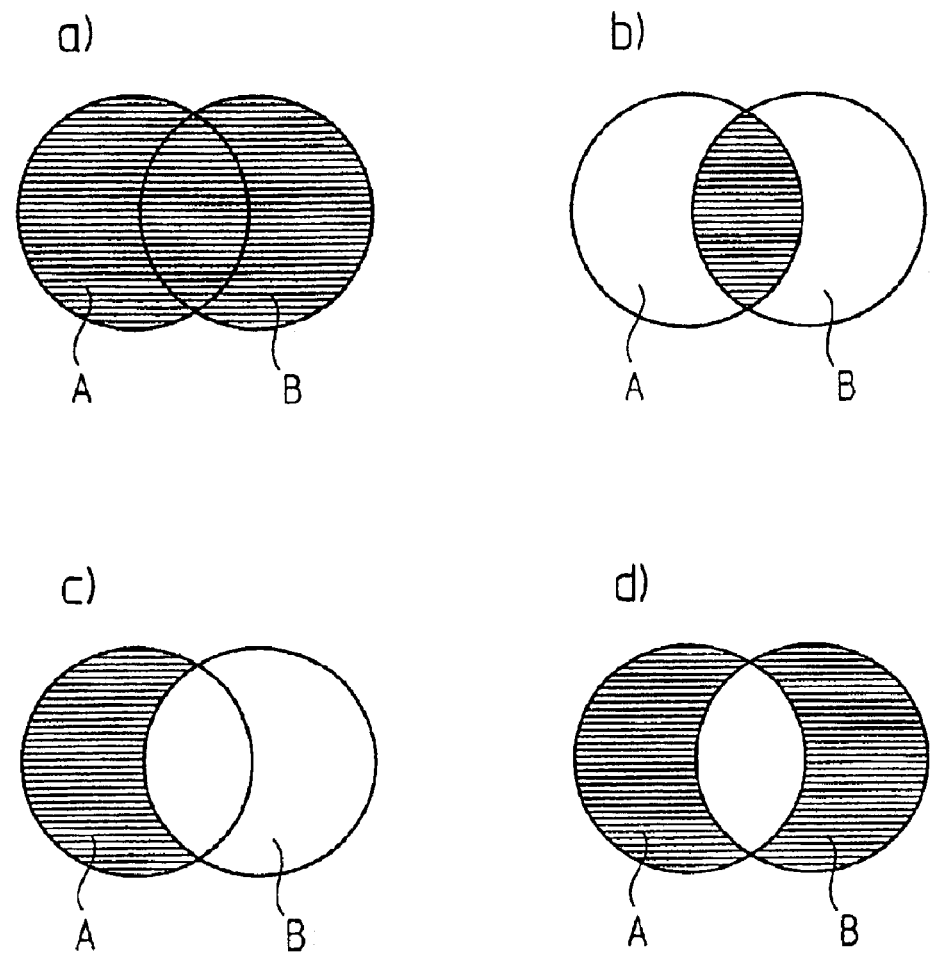
FIG. 4 illustrates different operations involving two elementary surfaces.

To provide better understanding, the operators used for combining elementary surfaces 4 are explained with the aid of FIG. 4. Of course, the result of such an operation, a combined surface, may be combined with an elementary surface 4 or a combined surface, using an operator.

FIG. 4a shows the union of a first surface A and a second surface B. This corresponds to a logical "A OR B" operation of the involved surfaces.

FIG. 4b shows the intersection of a first surface A and a second surface B. This corresponds to a logical "A AND B" operation of the involved surfaces.

FIG. 4c shows the intersection of a first surface A with the complement of a second surface B. This corresponds to a logical "A AND NOT B" operation of the involved surfaces.

FIG. 4d shows the union of a first surface A and a second surface B, minus the intersection of A and B. This corresponds to a logical "(A OR B) AND NOT (A AND B)" operation of the involved surfaces, or a "A EXCLUSIVE OR B", i.e., "A XOR B", operation of the involved surfaces.

In addition to the operators defined here, there are also additional, elements which allow a logical combination or operation of elementary surfaces 4 in a contour expression. Thus, one may require parentheses, in order to be able to preferentially calculate parts of the contour expression, as well as an operator for forming the complement of an elementary surface 4.

Figure 5:
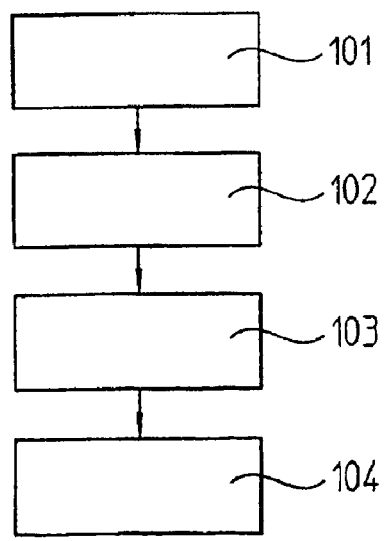
FIG. 5 illustrates a method for machining a contour pocket.

A method for defining a contour pocket 2 shall now be described in light of FIG. 5. In this context, reference is also made to the elements of a numerical control unit 11 and its graphic user interface 17 required for this, which are illustrated in FIG. 3 and FIG. 6.

As may be conventional, the method for defining a contour pocket 2 begins with a step 101 for defining at least two elementary surfaces 4. To this end, boundary 19, which encloses elementary surface 4, may be defined, for example, in a subroutine. Thus, a circular surface may be defined by the coordinates of the center point and the radius, or a triangular surface may be defined by specifying the coordinates of the vertices. To this end, the subroutine may be input into numerical control unit 11 via keyboard 13 and stored in memory 24. Elementary surfaces 4 may also have borders 19 that are markedly more complex than the simple geometric elements used in the examples. It is possible to use elementary surfaces 4 having an unclosed border 19, for instance, a half-plane cut off by a straight line. Elementary surfaces defined once may be used again to define a further contour pocket, e.g., by being called up by the subroutine stored in memory 24.

In a next step 102, elementary surfaces 4 are combined by operators 20. In this context, at least two elementary surfaces 4 are combined by operators 20 in a contour expression 14. Operators 20 having the logical function "OR", "AND", "AND NOT", and "EXCLUSIVE OR" are, for example, available. Numerical control unit 11 also accepts parentheses 22, in order to preferentially evaluate parts of contour expression 14. To form a "NOT" operator 20 for calculating the complement of an elementary surface 4 or of a combined surface 21 (e.g., a part of contour expression 14 put in parentheses 22). Softkeys 15, which allow specific operator 20 or a parenthesis 22 to be selected, are provided on video screen 12 of numerical control unit 11, in graphic user interface 17. These softkeys 15 contain picture symbols 23, which schematically explain specific operator 20 (in the manner of FIGS. 4a–d). In addition, help text 16 is displayed in graphic user interface 17, as soon as an operator 20 is selected. Contour expression 14 is stored in memory 24 of numerical control unit 11, via keyboard 13.

Subsequent step 103 may be taken after each change of contour expression 14. Contour expression 14 is evaluated and a resulting surface 18 is calculated in processing unit 25 of numerical control unit 11. This resulting surface 18 corresponds to the surface of contour pocket 2. In this context, contour expression 14 may be so completely complex, that several contour pockets 2 not connected to each other are formed. Even such a resulting surface 18 may be defined again as an elementary surface 4, which may then be further utilized in other contour expressions 14. Thus, it again becomes clear that an elementary surface 4 must not necessarily be simple.

In a further step 104, resulting surface 18 is displayed in graphic user interface 17 on video screen 12 of numerical control unit 11. In this context, resulting surface 18 is represented as a filled-in border 19, in order to allow resulting surface 18 to be rapidly comprehended. However, elementary surfaces 4 are only represented by their border 19. In graphic user interface 17, both contour expression 14 and resulting surface 18 may be shown at the same time, as illustrated in FIG. 6.

Figure 6:
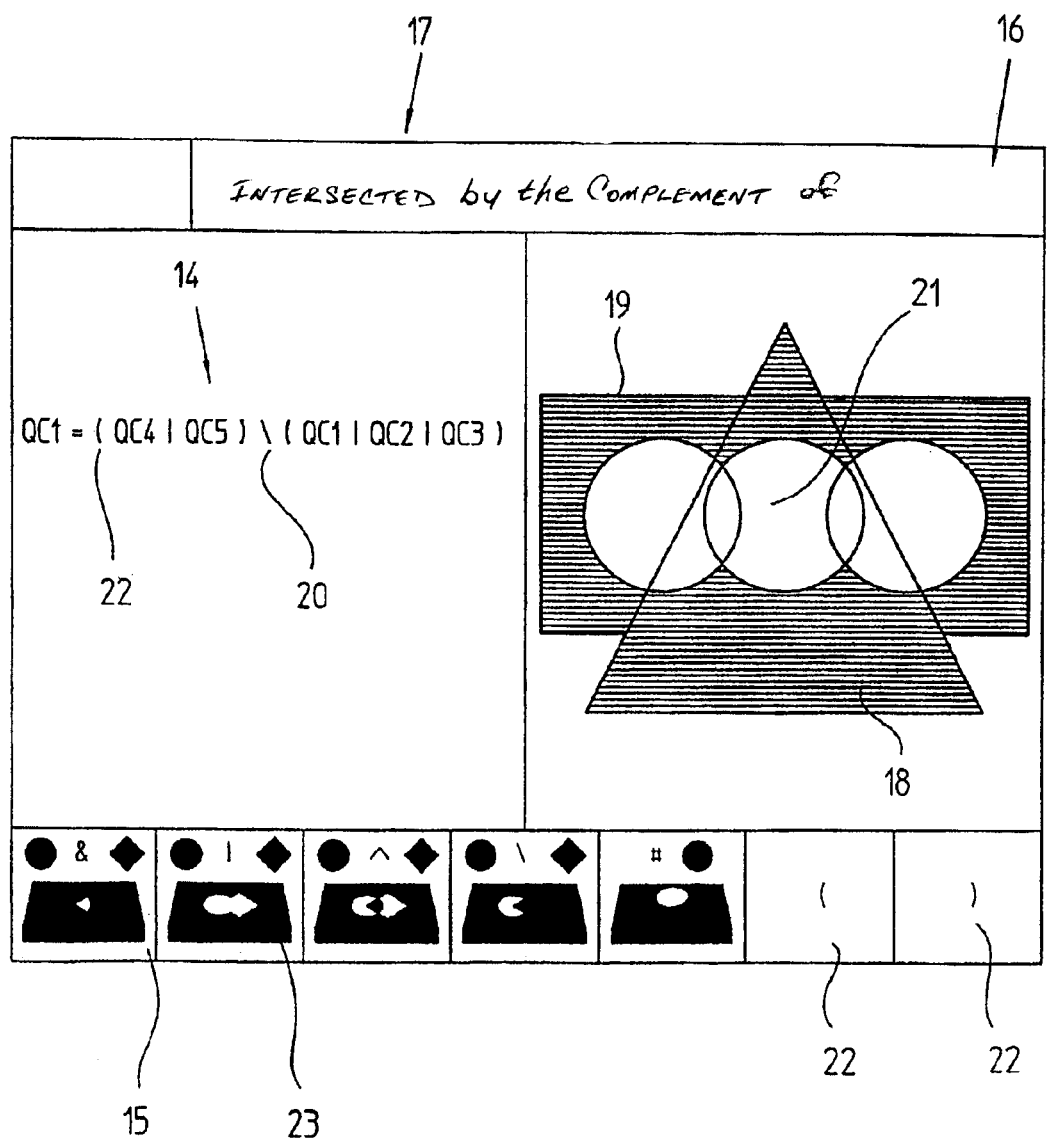
FIG. 6 illustrates a user interface including further operations involving elementary surfaces.

A further combination of elementary surfaces 4 is explained with the aid of FIG. 6. In contour expression 14, operands QC4 and QC5 denote elementary surfaces 4, in this case a rectangle and triangle, which are combined by operator 20 "OR" to form a first combined surface 21. In the same way, QC1, QC2, and QC3 denote circles, which are combined by operator 20 "OR". Because of parentheses 22, the two combined surfaces 21 are preferentially evaluated in processing unit 24. The two combined surfaces 21 are connected by the operator "AND NOT", so that the three combined circular surfaces QC1, QC2, and QC3 are subtracted from the union of rectangle QC4 and triangle QC5. In FIG. 6, resulting surface 18 is illustrated, as well as the help text 16 for "AND NOT" operator 20 last used, and softkeys 15 having their picture symbols 23.

When steps 103 and 104 are executed each time, as soon as a change is made to contour expression 14 in step 102, a user of numerical control unit 11 is provided as much support as possible for defining a contour pocket 2.

The further machining of contour pocket 2 may be accomplished in a conventional manner, in that numerical control unit 11 controls machine tool 8 so as to produce, in workpiece 1, a contour pocket 2 having the shape of resulting surface 18. The machining steps necessary for this may include, more or less, rough drilling, reaming, and finishing with the aid of suitable tools 10.

What is claimed is:

1. A method for machining contour pockets of a workpiece, comprising:

specifying at least a first elementary surface and a second elementary surface to a numerical control unit;

displaying softkeys, which correspond to operators and which include picture symbols that explain the operators, on a graphic user interface of the numerical control unit;

inputting a contour expression using the operators via the graphic user interface;

combining the first elementary surface with the second elementary surface in the contour expression using the operators to form a combined surface;

evaluating the contour expression and calculating a surface resulting from the contour expression; and displaying the resulting surface in the graphic user interface.

2. The method according to claim 1, wherein the combining step includes forming further combinations of the elementary surfaces and the combined surface in the contour expression.

3. The method according to claim 1, wherein the combining step includes at least one of:
- a union of a first surface and a second surface;
- an intersection of the first surface and the second surface;
- an intersection of the first surface and a complement of the second surface; and
- a union of the first surface and the second surface minus an intersection of the first surface and the second surface.

4. The method according to claim 1, wherein the contour expression includes at least one pair of parentheses, the contents of the parentheses preferentially calculated in the evaluating step.

5. The method according to claim 1, wherein the contour expression includes an operator to form a complement of one of: (a) the combined surface; and (b) at least one of the elementary surfaces.

6. The method according to claim 1, further comprising, after selection of an operator, displaying help text on the graphic user interface to explain the operator.

7. The method according to claim 1, wherein the resulting surface is displayed in the resulting surface displaying step by a filled-in border.

8. The method according to claim 1, wherein the contour expression includes a representation of the elementary surfaces only by a border of the elementary surfaces.

9. The method according to claim 1, further comprising repeating the evaluating step and the resulting surface display step after every change to the contour expression.

10. The method according to claim 9, further comprising displaying the contour expression and simultaneously the resulting surface, a change to the contour expression immediately resulting in a change in the displaying of the resulting surface.

11. The method according to claim 1, further comprising controlling a machine tool by the numerical control unit to produce the contour pocket having a shape of the resulting surface.

12. A numerical control unit for a machine tool, comprising:
an arrangement configured to perform a method for machining contour pockets of a workpiece, the method including:
  specifying at least a first elementary surface and a second elementary surface to the numerical control unit;
  displaying softkeys, which correspond to operators and which include picture symbols that explain the operators, on a graphic user interface of the numerical control unit;
  inputting a contour expression using the operators via the graphic user interface;
  combining the first elementary surface with the second elementary surface in the contour expression using the operators to form a combined surface;
  evaluating the contour expression and calculating a surface resulting from the contour expression; and
  displaying the resulting surface in the graphic user interface.

13. A numerical control unit for a machine tool, comprising:
means for specifying at least a first elementary surface and a second elementary surface to the numerical control unit;
means for displaying softkeys, which correspond to operators and which include picture symbols that explain the operators, on a graphic user interface of the numerical control unit;
means for inputting a contour expression using the operators via the graphic user interface;
means for combining the first elementary surface with the second elementary surface in the contour expression using the operators to form a combined surface;
means for evaluating the contour expression and calculating a surface resulting from the contour expression; and
means for displaying the resulting surface in the graphic user interface.

14. A device for machining contour pockets, comprising:
a numerical control unit configured to define the contour pockets;
a video screen configured to display a graphic user interface;
a memory configured to store data that relate to at least a first elementary surface and a second elementary surface and configured to store a contour expression, the data and the contour expression inputtable via a keyboard, the contour expression combining the elementary surfaces with each other using at least one operator;
wherein the numerical control unit includes a processing unit configured to calculate a resulting surface from the contour expression;
wherein the video screen is configured to display the resulting surface; and
wherein the graphic user interface includes softkeys that include picture symbols that explain the operators, the operators of the contour expression selectable via the softkeys.

15. The device according to claim 14, wherein the video screen is configured to display help text to explain the operator after the operator is selected.

16. The device according to claim 14, wherein the video screen is configured to simultaneously display the contour expression and the resulting surface from the contour expression in the graphic user interface.

* * * * *